Sept. 4, 1951 E. W. BOULDEN 2,566,977
CONVERTIBLE TRAILER AND TRUCK BED
Filed Sept. 22, 1948 2 Sheets-Sheet 1
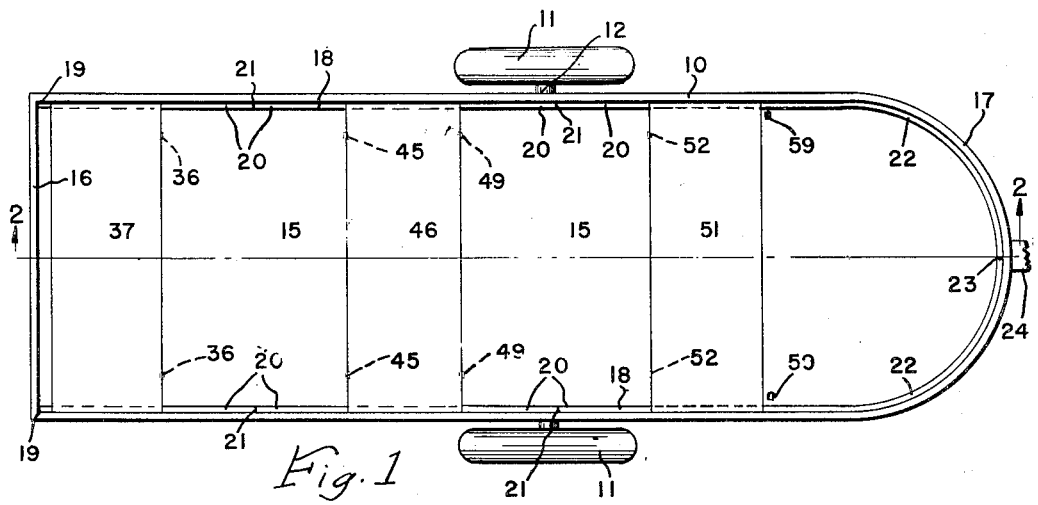
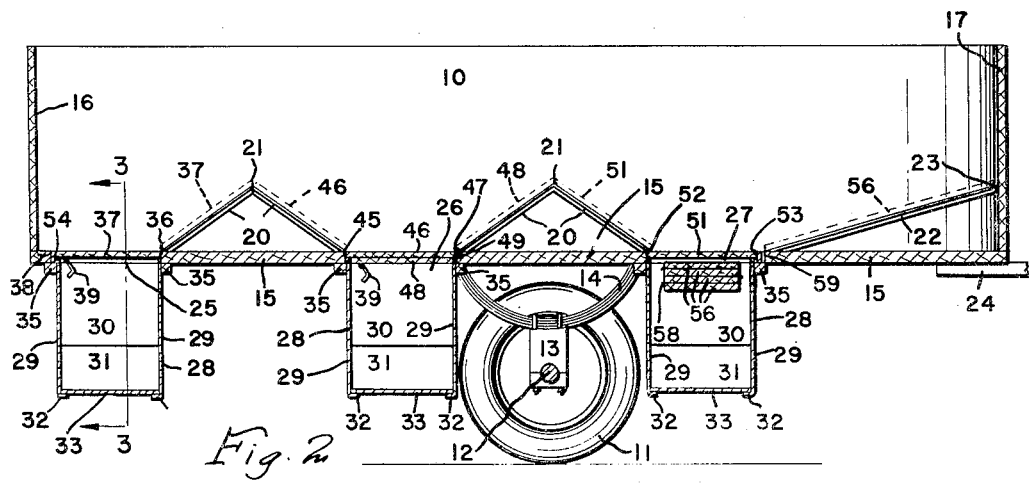
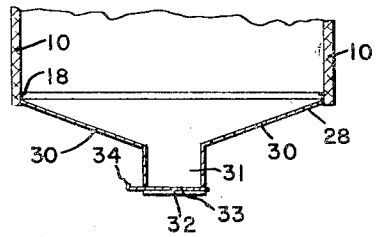
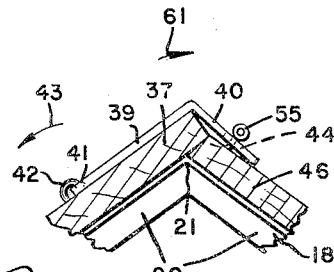
INVENTOR.
Edward W. Boulden
BY
Sam J. Slotsky
ATTORNEY Sept. 4, 1951 E. W. BOULDEN 2,566,977
CONVERTIBLE TRAILER AND TRUCK BED
Filed Sept. 22, 1948 2 Sheets-Sheet 2

INVENTOR.
Edward W. Boulden
BY
Sam J. Slotsky
ATTORNEY

Patented Sept. 4, 1951

2,566,977

UNITED STATES PATENT OFFICE 2,566,977

CONVERTIBLE TRAILER AND TRUCK BED

Edward W. Boulden, Sioux City, Iowa

Application September 22, 1948, Serial No. 50,597

1 Claim. (Cl. 298—27)

My invention relates to either a trailer or truck bed.

An object of my invention is to provide in such a trailer or truck bed, means whereby the bed can be used either for transporting any type of commodity or stock in a flat bed, or for transporting grain, with means associated with the grain transporting means for providing ready discharge of the grain at the ultimate terminal point thereof.

A further object of my invention is to provide a readily convertible arrangement in the truck or trailer whereby the cooperating members can be adjustably placed and secured in position to provide either one type of bed or the other.

A further object of my invention is to provide foldable and pivoted members so arranged to conveniently and quickly provide the above mentioned features.

A further object of my invention is to provide all of the above mentioned characteristics in a simplified arrangement which can be attached to standard trailer or truck body structures.

Figure 5:
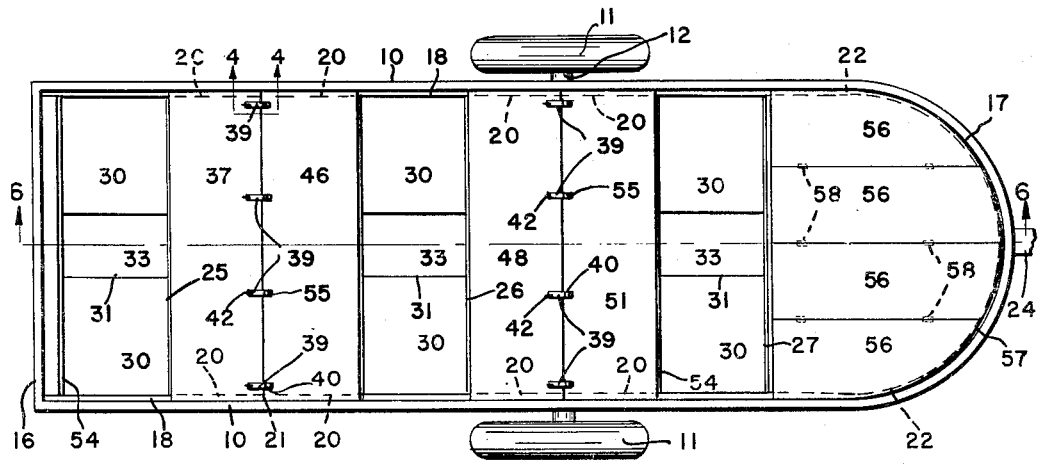
Figure 6:
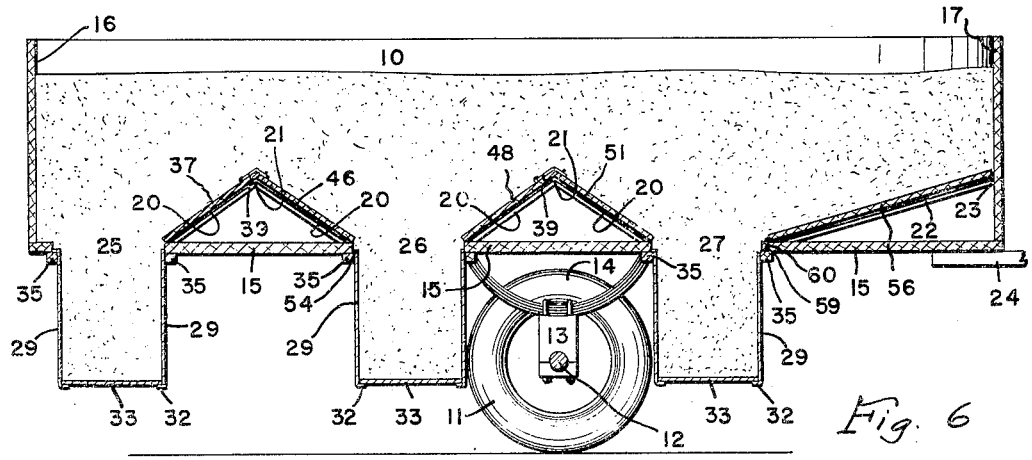
Figure 7:
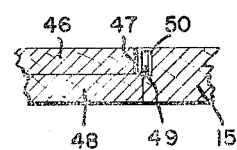

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view of a trailer showing the arrangement as used for ordinary transportation of any commodity other than grain and showing the bed being in a perfectly flat condition throughout, Figure 2 is a sectional view taken along the lines 2—2 of Figure 1, Figure 3 is a sectional view taken along the lines 3—3 of Figure 2, Figure 4 is a detail sectional view taken along the lines 4—4 of Figure 5, Figure 5 is a plan view of the arrangement showing the same ready for use as a grain transporting unit, Figure 6 is a sectional view of Figure 5 taken along the lines 6—6 thereof, and additionally showing grain in the unit, and Figure 7 is a further detail.

My invention contemplates the provision of any type of transporting vehicle body whether it be a trailer or truck, and with means provided therein to readily convert the same from a flat base or bed, to a bed having a series of inclined ramps with spouts associated with the ramps to provide discharge of grain. My invention further contemplates the provision of these means in an associated structure wherein the conversion can be made with all of the parts being adjustably secured within the truck or trailer body ready for use.

I have used the character 10 to designate the side walls of a trailer body, it being understood that my invention can also pertain to a truck body, and the character 11 to designate the side wheels journaled to the shaft 12 which in turn is secured within the downwardly projecting supports 13 attached to the leaf springs 14 which springs are suitably attached to the bed 15 of the box like structure, with the character 16 designating the rear wall thereof, and the character 17 the arcuate forward wall. Passing about the inner lower borders of the sides 10 is a continuous angle iron member 18 which includes the ends 19 and is bent into the upwardly inclined angle portions 20 terminating at the apexes 21, the continuous member 18 then passing about the arcuate portion 17 and within the same and extending into the further upwardly angularly inclined portions 22 terminating in the apex 23 at the forward end of the body, it being noted that there are thus provided pairs of such members 20 and 22 at either side of the body. The hitching bar is indicated by the character 24.

Provided in the bed 15 are a series of rectangular openings 25, 26 and 27, and attached within these openings are the downwardly extending spout members 28 which include the end walls 29 and the angularly inclined downwardly converging side walls 30 which terminate in the further rectangular portion 31 which includes the overlapping flanges 32 for receiving the slidable gates 33 terminating in the handles 34. The spout members 28 can be secured to the transverse braces 35 or to the bed directly as desired. Suitably pivoted to hinges at 36 is a panel or door 37 terminating at 38 with the panel 37 including a series of equally spaced strap members 39 which strap members include the integral bent over portions 40. The strap members 39 are pivotally secured at 41 to an eye-bolt or to a U-shaped nail or bolt 42 which will allow pivoting of the member 39 in the direction of the arrow 43 (see Figure 4) after use thereof, as will be explained later. The portion 40 includes a lengthened slot at 44. Also suitably hinged at 45 is a further panel member 46 terminating at 47 and which is adapted to normally rest upon a still further panel 48 which is hinged at 49 (see Figure 7) within a series of vertically positioned slotted members 50 which will allow the pivoting points 49 to be elevated. The panel 48 also includes a series of equally spaced similar straps 39, etc. A further panel 51 is suitably hinged at 52 and terminates at 53. The various panels or doors 37, 48 and 51 can be supported by suitable transverse strips 54 if desired.

The panels 46 and 51 include the eye-bolts 55 attached thereto for reception into the slots 44 as will be explained.

A further member for reception into the forward end of the body comprises a series of foldable panels 56 which can include the arcuate borders 57, these panels being hinged at 58 and so that they will fold up or collapse into the position shown in Figure 2 wherein they can be stored within one of the spout members 28 when not in use, the diverging walls 30 of the spout retaining the members in a relatively higher position wherein they can be removed for use. The bed 15 includes a pair of openings 59, and attached to the outer panels 56 are the rods 60 which can be received within the openings 59.

Now that the structure of my device has been explained, I shall explain the operation thereof. For transporting livestock or other commodities, the bed 15 will appear as shown in Figure 1 and with the various panels in a perfectly flat position as shown in Figure 2 by the solid structure. In this arrangement, there are no projecting parts except the angle members 18 passing around the interior of the unit. The unit is then readily adapted for the use of transporting the above mentioned animals or commodities, and if desired, end gates can be placed in the rear of the trailer, etc.

However, when it is desired to transport grain, before the grain is placed in the unit, first the various panels are pivoted upwardly and about their pivots until they occupy the positions shown by the dotted lines in Figure 2, and the solid lines in Figure 6, the side edges of the various panels 37, 46, 48, and 51 then resting against the inclined angle members 20, whereby the inclined structures thus provided will have their ends in abutment as shown in Figure 4 thereby providing additional rigidity and bracing. The straps 39 are then swung over in the direction of the arrow 61 (see Figure 4) wherein the portions 40 will overlie the adjacent panels, the slots 44 being placed over the heads of the eye-bolts 55, after which the eye-bolts 55 are turned 180 degrees to thereby lock the portions 40 and 39 against the panels, this serving to further brace and rigidify these structures. The foldable members or panels 56 are then removed from one of the spouts 28, in the present instance being shown in the forward spout, these members are then unfolded to provide a flat inclined surface having its edges resting upon the inclined angles 22 and with its lower borders resting upon the bed 15, with the rods 60 being inserted into the openings 59 to retain the structure in place. The box is then filled with grain whereby it will appear substantially as shown in Figure 6 ready for transporting, with the spouts being filled and ready for discharge.

After the trailer or truck as the case may be, is transported to the necessary ultimate location, the gates 33 are withdrawn, and the grain will then gravitate into the desired receptacles or other arrangements for receiving the same, thereby providing a readily dischargeable bed or body, with the various inclined panels further providing means for causing the grain to gravitate downwardly in a positive manner causing a quick and uniform discharge of the same.

After such use, the various straps 39 are unlocked as well as the members 56, the panels are swung back to their flat position, the panels 56 are collapsed or folded together and placed into one of the spouts, with the arrangement then being ready for its other function.

It will now, therefore, be seen that I have provided all of the advantages mentioned in the objects of my invention, with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A convertible vehicle transporting unit comprising a bed having a plurality of openings, discharge members communicating downwardly from said openings, means for normally covering said openings to provide a flat bed surface, said means including hinged pivoting panels covering said openings, said unit including angularly positioned supporting members attached therein, said panels being adapted to be supported in angular position when pivoted away from said openings toward said supporting members to thereby provide sloping walls to cause grain placed in said unit to gravitate uniformly downwardly through the said discharge members, said discharge members including spouts having downwardly converging walls, means for securing said panels together when in angular position, including strap members pivotally attached to each of a pair of panels, means for securing said strap members to the other of each of said pair.

EDWARD W. BOULDEN.

REFERENCES CITED

The following references are of record in the file of this patent:

UNITED STATES PATENTS

| Number | Name | Date |
|---|---|---|
| 847,964 | Miller | Mar. 19, 1907 |
| 995,215 | Becker | June 13, 1911 |
| 1,026,694 | Neikirk | May 21, 1912 |
| 1,232,822 | Malcher | July 10, 1917 |
| 1,370,658 | Malcher | Mar. 8, 1921 |
| 2,049,617 | Pflager | Aug. 4, 1936 |